US005817962A

United States Patent [19]

Behrenfeld

[11] Patent Number: 5,817,962

[45] **Date of Patent: *Oct. 6, 1998**

[54] SELF-ALIGNING DRUM BEATER ASSEMBLY

[76] Inventor: Eric J. Behrenfeld, 1737 N. Paulina, Unit 107, Chicago, Ill. 60622

[ * ] Notice: The term of this patent shall not extend beyond the expiration date of Pat. No. 5,526,728.

[21] Appl. No.: 597,843

[22] Filed: Feb. 7, 1996

Related U.S. Application Data

[63] Continuation-in-part of Ser. No. 375,448, Jan. 18, 1995, Pat. No. 5,526,728.

[51] Int. Cl.[6] .................................................... G01D 13/02

[52] U.S. Cl. ......................................... 84/422.1; 84/422.4

[58] Field of Search ............................... 84/422.1, 422.2, 84/422.3

[56] References Cited

U.S. PATENT DOCUMENTS

| | | | |
|---|---|---|---|
| 3,217,581 | 11/1965 | Hinger | 84/422.4 |
| 5,526,728 | 6/1996 | Behrenfeld | 84/422.1 |

*Primary Examiner*—Cassandra C. Spyrou
*Attorney, Agent, or Firm*—Michael R. McKenna

[57] ABSTRACT

A self-aligning bass drum beater that allows the drummer to play without the need to make any adjustments to the beater. Because it is self-aligning, it remains centered when impacting the bass drum head, producing maximum sound projection. The beater also has two different contact surfaces 180° apart which may be selectively rotated to create different sounds when striking the head of a bass drum.

41 Claims, 3 Drawing Sheets

SELF-ALIGNING DRUM BEATER ASSEMBLY

BACKGROUND OF THE INVENTION

The applicant claims the benefit of the following prior filed United States application by the same inventor: U.S. application, Ser. No. 08/375,448, now U.S. Pat. No. 5,526,728, filed Jan. 18, 1995, of which this is a CIP.

The invention relates to a drum beater assembly which is typically used with a bass drum and a drum beater foot pedal. The improved self-aligning drum beater assembly of the present invention discloses a novel self-aligning beater which allows the head to self-align with a flat striking surface of a bass drum.

The self-aligning beater device comprises a drum beater head having preferably two impact surfaces which may be selectively rotated to expose one of the impact surfaces to the striking surface of a bass drum.

The impact surface of the head is free for angular displacement relative to the shaft and for circumferential rotation about the shaft, whereby, the impact surface of the head may independently align itself with the striking surface of a drum by swiveling angularly relative to the shaft and by rotating circumferentially about the shaft as the impact surface of the head engages the flat striking surface of the drum. A thin layer of felt may be attached to each of the impact surfaces to reduce wear and soften the blow.

It uniquely employs a unitary axle independent of moving parts for mounting the head to an upwardly extending shaft while leaving the impact surface of the head free for angular displacement relative to the shaft and for circumferential rotation about the shaft.

The self-aligning drum beater may be used with a bass drum pedal and a flat striking surface of a bass drum.

ADVANTAGES OF THIS INVENTION

The instant invention is an improvement over current bass drum beaters because it allows the drummer to play the bass drum with no adjustment of the beater. Because the instant invention is self-adjusting, it remains centered when impacting the bass drum head, causing maximum sound projection.

How it remains centered is a function of its design. It can rotate circumferentially about the shaft. It also will move angularly relative to the shaft. The best mode contemplated provides the head may angularly displace relative to the shaft up to 15° to accommodate changes in the distance of the beater head from the point where it attaches to the foot pedal relative to the position of the bass drum head (striking surface).

The drum beater head has means for engaging at least one flat notch of the shaft to selectively align the head with the shaft.

Most current beater heads are fixed, and do not move relative to the shaft without manual adjustment requiring a tool. Once set up in the foot pedal, they are tightened and no adjustment can be made unless they are loosened and repositioned.

These fixed beaters have the tendency not to hit the bass drum squarely unless matching drum and foot pedal components and the set-up by the drummer are perfect. Imperfect settings affect sound quality due to poor surface contact.

A normal Bass Drum beater shaft is a straight rod having a diameter suitably sized to be captured in a 0.250" hole of a standard Bass Drum Pedal. Generally, the shafts are made of stainless steel rod stock to fit inside this standard hole of 0.250"—usually 0.234" (15/64 inch). The shaft of the improved self-aligning drum beater assembly employs a taper from a medial position along the shaft tapering toward the proximal end of the shaft that is captured in the hole of a standard Bass Drum Pedal. The improved shaft of the present invention may also use a Titanium or a stronger grade steel.

The shaft of the improved self-aligning drum beater assembly produces advantages over prior art in that it creates a stronger shaft that flexes less at the beater (distal) end and it resists permanent bending. Uniform cross-section shafts bend uniformly throughout their entire length. The tapered shaft resists this tendency toward uniformity: flexing minimally at the distal end which may be thicker than the uniform cross-section shafts that are limited in diameter to less than the 0.250" hole of the foot pedal; and having an increasing flexure approaching the proximal end where the shaft is connected to the foot pedal. This drives the beater head into the drum with more power because of a stiffer, straighter shaft distal end.

A desirable material for use in the shaft of the instant invention is Titanium. Titanium is considerably lighter and more flexible than traditional stainless steel. However, standard diameter shafts are too thin to resist permanent bending and are too flexible for titanium. The tapered shaft design of the instant invention allows the use of titanium metal by controlling its flex, making it functional for a beater shaft.

Additionally, because the tapered shaft of the instant is proportionally thicker at the drum beater distal end, it creates a top end weighted shaft with added mass close to the beater head. The effect is similar to adding a balancing weight near the distal end of a standard straight shaft. The drummer will experience a better sense of feel with the foot pedal because the tapered shaft adds to the beater head's inertial mass, creating greater centrifugal forces and making the beater head easier to "feel" as it swings. The lighter titanium shaft with a "top" heavy balance increases this sense of "head feel", similar to the feel of a golf club versus a more uniformly weighted baseball bat.

The centrifugal force and the corresponding moment of force translates into an increased sense of "head feel" and drum beater power, but adding too much weight can make the beater more fatiguing and tiring to play. Because of the tapering, the improved self-aligning drum beater assembly needs no added balancing weight. The tapered shaft of this important invention has its own balance, and greater end mass, creating a more powerful drum sound with less shaft weight and less drummer fatigue.

Moreover, the shaft tapering allows for needed length adjustability. The shaft playing length varies depending on where the shaft end is set relative to the foot pedal. To allow lengthening or shortening of the shaft length (i.e. to change the moment of force), the diameter of the proximal end of the shaft is sized to accommodate approximately 1½" of length adjustment to meet the needs of the drummer. The longer the shaft extends from the foot pedal, the more force a beater will have; and the shorter the setting, the easier and faster foot speed will occur. Drummers like to position the beater's height (i.e. the distance of the beater head on the extended shaft from the foot pedal) to complement their individual playing style. The lighter titanium shaft also increases this sense of "head feel".

Because of the balance tapered shaft design, no other bass drum beater shaft is as strong or has an integral end weighted balance that increases feel as that presented by the instant invention.

In addition, during play, the bass drum foot pedal, which the beater is attached to, will sometimes loosen from the bass drum particularly if the pedal was not squarely aligned initially. Under such circumstances, the skewed contact between a fixed beater and the head of the bass drum tends to move the pedal in a lateral direction which eventually becomes unplayable causing the drummer to stop playing and reset the pedal position. This problem is reduced substantially by the present invention.

With the instant invention, this tendency is reduced, even eliminated, because the beater aligns itself to hit square at all times.

The instant invention beater head design described herein has two different contact surfaces, 180 degrees apart. One side has a high impact, maximum surface area shape, the other a minimal tangent line of contact (oval ended side). Because of style changes in music and songs, it makes things easier if the drummer can turn the beater head around quickly for a different bass drum sound, without having to use tools or stopping to reset the beater in the foot pedal, and just keep playing. In other words, with the same foot pedal motion, two different sounds can be made with the instant invention simply by turning the head around 180 degrees.

A preferred material of the head is HYTREL®. This material was chosen for its ability to resist heat (from friction), retain its shape (from impact) and not "color" or change the sound in an undesirable manner. Hard beater heads made of wood or other hard plastics tend to cause a loud sharp "click" when impacting the bass drum head. Beater heads made of compressed felt are very soft sounding and extremely limited to their ability in shaping for manufacture. The HYTREL® combines the best features of these beaters to produce a new unique sound, only available from using the instant invention bass drum beater of the disclosed invention.

A preferred material for the center cap which holds the head, is a glass filled nylon which is used for durability, strength and resistance to stretch, bending, and brittleness which results in breakage. The shaft is made of stainless steel which is superior in resisting permanent bending.

In conclusion, because of the shape, material, and mechanical function of the instant invention beater, it has a new unique sound producing capability never before available to drummers. In addition, it works better with the foot pedal, because it inhibits loosening by remaining square during play. Also, the drummer using the instant invention needs no tools to set it up, other than fastening the shaft into the foot pedal.

The instant drum beater device provides an efficient and convenient means for self-alignment.

Still other advantages will be apparent from the disclosure that follows.

SUMMARY OF THE INVENTION

The invention relates to a drum beater apparatus which is typically used with a bass drum and a drum beater foot pedal. The present invention discloses a novel self-aligning beater which allows the head to self-align with a flat striking surface of a bass drum.

The self-aligning beater apparatus comprises a drum beater head having at least one impact surface and an elongated passageway extending from the bottom thereof to receive a shaft, and a means for mounting the head to an upwardly extending shaft while leaving the impact surface of the head free for angular displacement relative to the shaft and for circumferential rotation about the shaft, whereby, the impact surface of the head may independently align itself with the striking surface of a drum by swiveling angularly relative to the shaft and by rotating circumferentially about the shaft as the impact surface of the head engages the flat striking surface of the drum.

The self-aligning drum beater may be used with a bass drum pedal and a flat striking surface of a bass drum. It uniquely employs a unitary axle independent of moving parts for mounting the head to an upwardly extending shaft while leaving the impact surface of the head free for angular displacement relative to the shaft and for circumferential rotation about the shaft. In that way the impact surface of the head may independently align itself with the striking surface of the drum by swiveling angularly relative to the shaft and by rotating circumferentially about the shaft as the impact surface of the head engages the flat striking surface of the drum.

BRIEF DESCRIPTION OF THE DRAWINGS

Preferred embodiments of the invention are described hereinafter with reference to the accompanying drawing wherein.

DETAILED DESCRIPTION OF THE INVENTION

Figure 1:
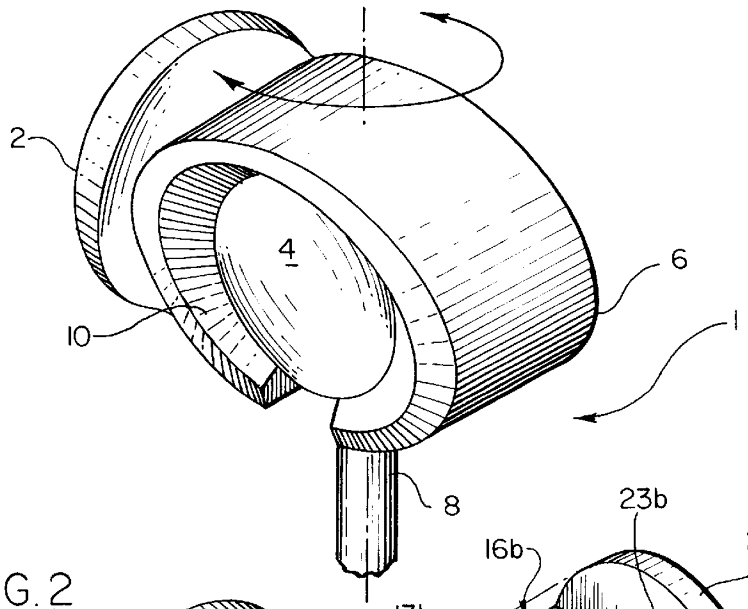
FIG. 1 is a perspective view of a preferred embodiment of the self-aligning beater of the present invention with the head thereof attached to an upstanding shaft.

The preferred embodiments depicted in the drawing include a self-aligning beater which allows the head to self-align with a flat striking surface of a bass drum. The beater depicted has two impact surfaces disposed on opposite sides of the head which can be selectively positioned. Without departing from the generality of the invention disclosed herein, the head should have at least one and could be provided with additional impact surfaces, and with varying ranges of angular displacement relative to the shaft. The discussion that follows, without limiting the scope of the invention, will refer to the invention as depicted in the drawing.

Figure 2:
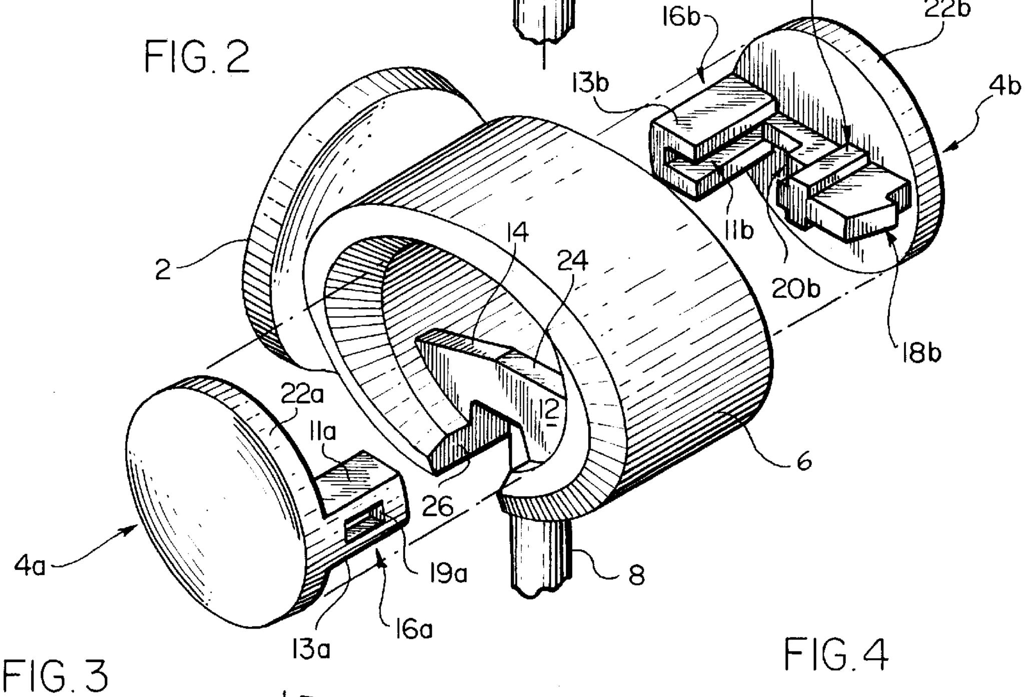
FIG. 2 is an exploded perspective view of the self-aligning beater of FIG. 1 with the caps exploded outwardly to show the interior structure of the head and the snap fastening projection disposed on the interior side of the caps.
Figure 5:
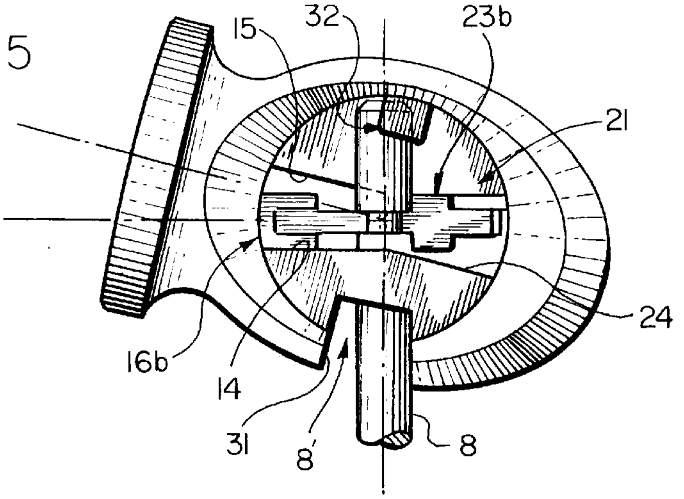
FIG. 5 is a side elevation view of the self-aligning beater of FIG. 4 with the head angularly displaced relative to the shaft.

As best shown in FIG. 2 of the drawing, the present invention provides a self-aligning drum beater adapted for use with a bass drum pedal and a flat striking surface of a bass drum (not shown). The device comprises a drum beater head 1 having at least one impact surface (2, 6) and an elongated passageway 8' extending from the bottom thereof to receive a shaft 8. A means for mounting the head 1 to an upwardly extending shaft 8 is provided that leaves the impact surface of the head 1 free for angular displacement relative to said shaft (as shown in FIG. 5) and for circumferential rotation about said shaft, as illustrated by the arrow in FIG. 1. This embodiment of this important invention allows the impact surface (particularly 2) of the head 1 to independently align itself with the striking surface of a drum by swiveling angularly relative to the shaft and by rotating circumferentially about the shaft as the impact surface of the head engages the flat striking surface of the drum.

In a preferred embodiment, as shown in FIG. 2, the beater head 1 comprises an elongated housing having a generally flat impact surface 2 disposed on one end and an arcuate surface 6 on the other.

The head 1 further has laterally disposed openings 14 on the sides thereof, said openings 14 have a resilient seating area disposed in said housing. The instant device further comprises a pair of identical caps, each of which may be disposed in one of said openings 14.

Referring again to FIG. 2, the self-aligning drum beater comprises a unitary axle independent of moving parts for mounting the head to the upwardly extending shaft. The self-aligning drum beater employs a pair of caps (4_a_, 4_b_) as a means for mounting the head 1 to the shaft 8.

Each cap has a disk-like shape with an exterior side and an interior side with an irregularly shaped elongated projection disposed on the interior side thereof. As shown on cap 4_b_, each such projection comprises a snap fastener having a male snap fastening member 18_b_ and a female snap fastening member 16_b_ disposed on the other end thereof. As shown in FIG. 2, the male snap fastening member 18_b_ is arranged and adapted to lockingly engage female snap fastening member 16_a_ of cap 4_a_ as the respective caps are joined with the projections in a face to face relationship.

The projection of the cap 4_b_, as shown in FIG. 2, reveals a female snap fastener 16_b_ having a channel shaped body 13_b_ disposed horizontally with a horizontal recess 11_b_ disposed therein which is arranged and adapted to receive a male snap fastener (not shown) of cap 4_a_ (identical to 18_b_ of cap 4_b_). Said female snap fastener 16_b_ has an opening disposed in the channel shaped body 13_b_ for receipt of the male snap fastener. This aspect of the invention can be seen on cap 4_a_, wherein the opening 19_a_ is disposed in channel shaped body 13_a_ for receipt of the male snap fastener 18_b_.

Figure 6:
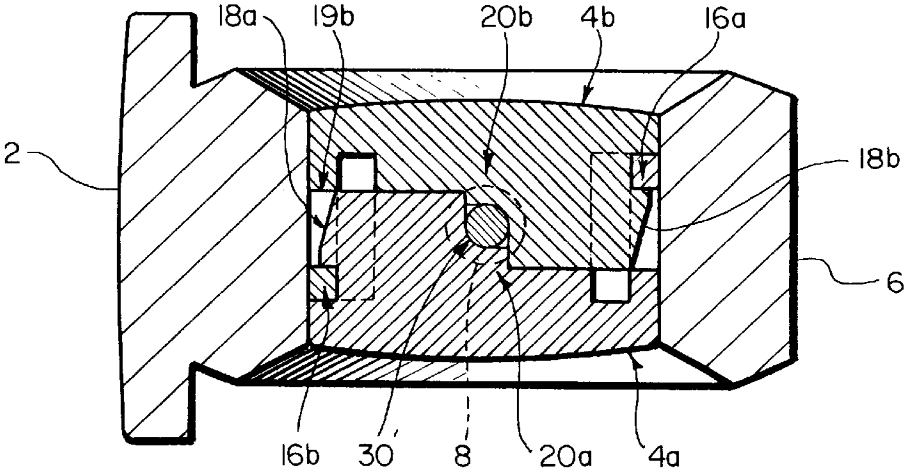
FIG. 6 is a cross-sectional take along the line 6—6 of FIG. 3 showing the snap fastening projection disposed on the interior side of each of the caps in a locking engagement with each other and further showing the orifice thereby created for the circumferential groove of the shaft.

As shown in FIG. 6, each of said caps further comprises a centrally disposed web (20_a_ and 20_b_, respectively). The webs of the respective joined caps are arranged and adapted to form an orifice 30' in which the shaft 8 having laterally grooved section 30 may be rotatingly disposed. Whereby, the joined caps may rotatingly secure the head 1 to the laterally grooved section 30 of the shaft 8.

Figure 3:
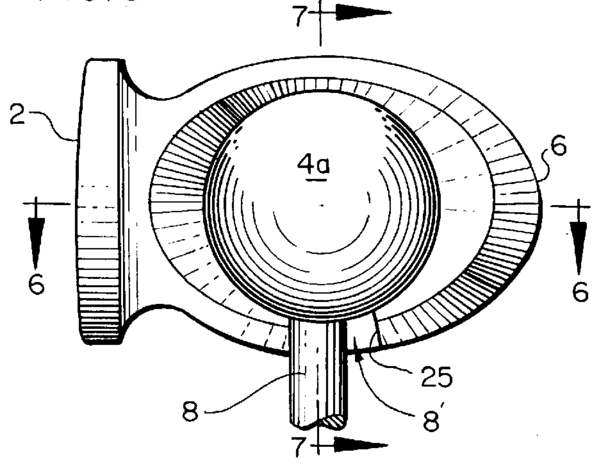
FIG. 3 is a side elevation view of the self-aligning beater of FIG. 1.

As shown in FIG. 3, the beater head 1 is positioned on the upstanding shaft 8 which shaft is extended into the passageway 8' of the head. Since the head is designed to angularly displace relative to the shaft, the passageway 8' of the head 1 has a tapered entrance 24.

Figure 4:
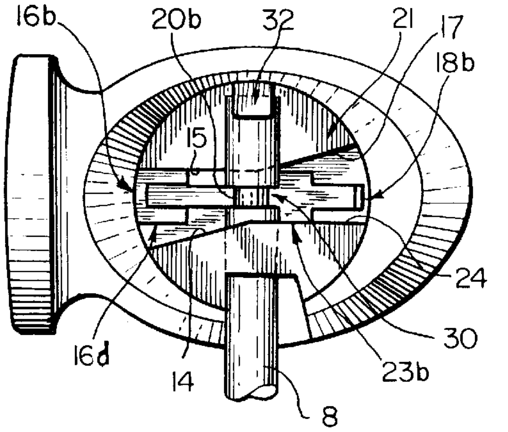
FIG. 4 is a side elevation view of the self-aligning beater of FIG. 1 with the proximate cap removed to show the relationship between the interior structure of the head and the snap fastening projection disposed on the interior side of the distal cap.

FIG. 4 shows the preferred embodiment of the current invention with cap 4_a_ removed disclosing the arrangement of the head 1, cap 4_b_, and the shaft 8. On the head is shown that an interior wall 21 with the chamfered edge is disclosed. The interior wall 21 has lower edges 15 and 17. With the head having the angular displacement as shown in FIG. 4, edge 15 engages the top of the female snap fastener 16_b_ of cap 4_b_. With the head having the angular displacement as shown in FIG. 5, edge 14 engages the bottom 16_d_ of the female snap fastener 16_b_ of cap 4_b_. The web 20_b_ of said cap engages the grooved section 30 of the shaft 8. To the right of the shaft the web 20_b_ widens vertically disposing a contact surface 23_b_ which abuts chamfered edge 24 of interior wall 12. Additionally, a downwardly projecting nub 32 of the head is positioned laterally to engage both cap 4_a_ and shaft 8. This aspect can be more clearly viewed in FIG. 7.

FIG. 5 is like FIG. 4, with only with the head 1 angularly displaced maximally relative to shaft 8, such that the edge 14 of interior wall 12 is now in contact with the female snap fastener 16_b_ of cap 4_b_ and the vertically extended section of the web 23_b_ is in contact with edge 17 of interior wall 21. Moreover, if the tapered angle of the passageway 8' is equal to the chamfered angle of the edges of the respective interior walls (12 and 21, respectively) then the shaft 8 will be in contact with surface 25 of the passageway 8' of the head 1.

Figure 7:
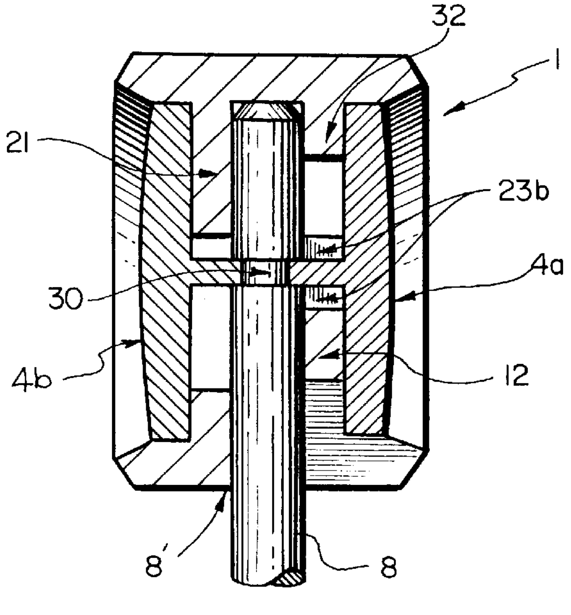
FIG. 7 is a cross-sectional view taken along the line 7—7 of FIG. 3 showing the snap fastening projection disposed on the interior side of each of the caps in a locking engagement with each other and further showing some of the frictional contact surfaces disposed internally in the present invention.

As best shown in FIG. 7, the means for mounting further provides frictional engagement with the head to dampen angular movement of the head relative to the shaft. Such frictional engagement exist between wall 21 and the cap 4_b_ and the shaft 8, and between wall 12 and the shaft 8 and the cap 4_a_. Additionally, each cap's peripheral edge (22_a_ and 22_b_, respectively) frictionally engages the head. The frictional resistance allows the head to angularly displace in an infinite number of positions between the physical limits referenced herein.

Moreover, frictional engagement between the respective webs (20_a_ and 20_b_) of the caps and the circumferential groove 30 of the shaft 8 to dampen circumferential rotation of the head about said shaft is provided, as best shown in FIGS. 4, 5, 6, and 7.

In a preferred embodiment, the means for mounting provides a first frictional engagement with the head to dampen angular movement of the head relative to the shaft and a second frictional engagement with the head to dampen circumferential rotation about said shaft.

The circumferential groove 30 is disposed proximate to the end disposed in the passageway 8' of the head 1. For shafts that are not cylindrical a lateral groove having a circular cross-section may be employed.

In the embodiments disclosed, the means for mounting the head to the shaft is movable relative to said shaft.

Moreover, it is also movable relative to said head. Furthermore, in the preferred embodiments disclosed, the means for mounting the head to the shaft is movable relative to the shaft and to the head.

As shown in FIG. 2, the means for mounting comprises a pair of identical caps (4*a* and 4*b*). Each cap has a disk-like shape having an exterior side and an interior side and an irregularly shaped elongated projection disposed on the interior side thereof. The projection comprises a snap fastener having a male snap fastening member (18*a* and 18*b*, respectively, see FIG. 6) disposed on one end and a female snap fastening member (16*a* and 16*b*, respectively) disposed on the other end. Each male snap fastening member is arranged and adapted to lockingly engage the female snap fastening member disposed on the other cap as the respective caps are joined with the projections in a face to face relationship with one of the caps rotated 180° from a mirror image of the other cap.

Each of the caps further comprises a web (20*a* and 20*b*) disposed between its male and female snap fastening members. The webs of the respective joined caps are arranged and adapted to form an orifice in which a lateral groove of the shaft may be rotatingly disposed. In this way, the caps may rotatingly secure the head to a lateral grooved shaft.

The self-aligning drum beater of the present invention further comprises a means for limiting the angular displacement of the head relative to the shaft. This comprises at least one partial vertical wall (12 and 21, respectively) disposed internally with a chamfered exposed edge (14 and 24, respectively for wall 12, and 15 and 17, respectively for wall 21). The respective edges are arranged and adapted to limit the angular displacement of the head relative to the shaft as it engages the respective projections of the joined caps. See FIGS. 4 and 5, respectively. In another embodiment, the edges of the disk-like section of the cap may be beveled.

The head 1 further comprises an outwardly tapering passageway 8' to allow the head to angularly displace relative to the shaft free from binding the shaft. See tapered wall 24 of FIG. 3.

In a preferred embodiment, as shown in all of the figures of the drawing, the head 1 of the self-aligning drum beater comprises two impact surfaces (2 and 6, respectively) disposed on opposite sides thereof.

In a preferred embodiment, at least one of the impact surfaces is generally disk-like with a slight convex aspect 2 and at least one of the impact surfaces is an arcuate surface 6 comprised of a plurality of parallel lines, each of said parallel lines being perpendicular to the axis of the passageway of said head. As shown in FIG. 1, a first impact surface 2 is generally disk-like with a slight convex aspect and a second impact surface is an arcuate surface 6 comprised of a plurality of parallel lines, each of said parallel lines being perpendicular to the axis of the passageway of said head.

Figure 10:
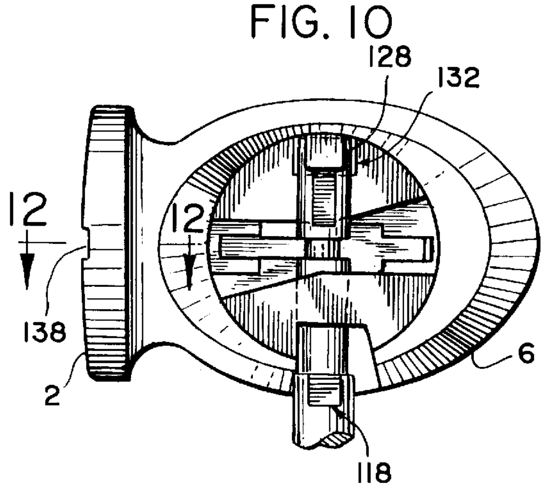
FIG. 10 is a side elevation view of a second preferred embodiment of the self-aligning beater of FIG. 1 with the proximate cap removed to show the relationship between the interior structure of the head and the snap fastening projection disposed on the interior side of the distal cap with the pad and recess shown.
Figure 12:
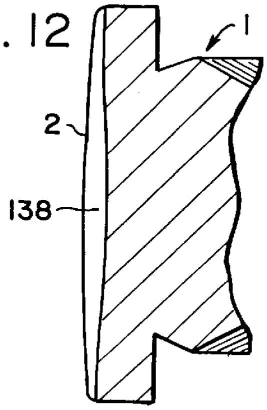
FIG. 12 is a fragmentary cross-sectional view taken along the line 12—12 of FIG. 10 showing the vacuum breaking surface recess on the impact surface of the drum beater.
Figure 13:
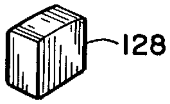
FIG. 13 is a perspective view of the pad of FIGS. 10 and 11.

As shown in FIGS. 10 and 12 of the drawing, a preferred embodiment of the instant invention reveals a means for breaking vacuum between the impact surface of the head and the striking surface of the bass drum. Such means for breaking vacuum may comprise a surface recess 138 disposed on at least one peripheral edge of the impact surface and many other commonly known methods.

Although frictionally resisted, the head 1 may be manually rotatable circumferentially about an upstanding shaft 8, whereby each of the impact surfaces may be selectively disposed proximate to the striking surface of a bass drum.

The instant invention may further comprise a shaft 8 having a lateral groove 30 disposed proximate to an end which may be disposed in the passageway of the head 1.

Figure 9:
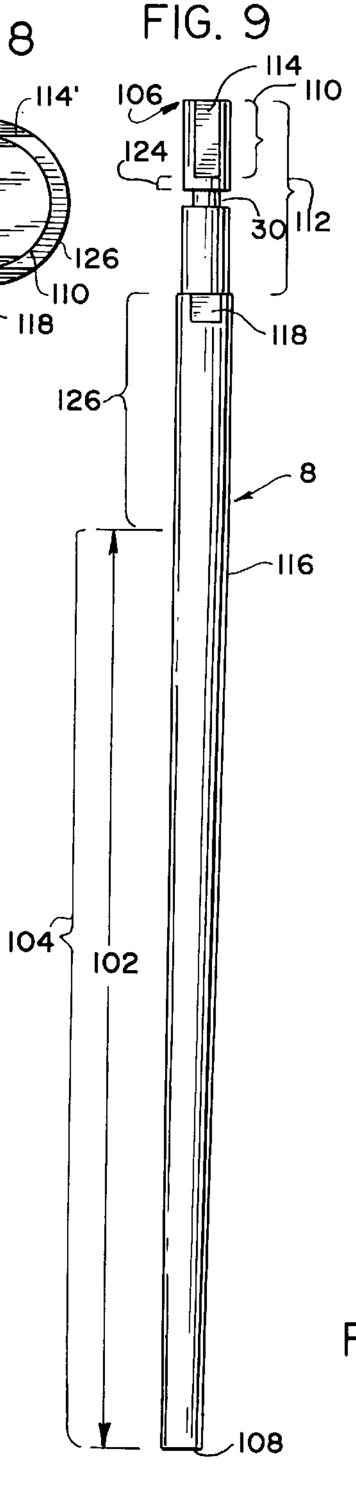
FIG. 9 is a side elevation view of the shaft of FIG. 8 showing the notches and taper thereof.

A preferred embodiment of the present invention as best shown in FIG. 9, comprises a shaft 8 having a taper 104 extending along at least a segment 102 of its length. A preferred material for the shaft is Titanium.

Referring to FIG. 9, the shaft has a distal end 106 and a proximal end 108 with a lateral groove 30 disposed near the distal end 106. The shaft 8 has a longitudinal axis and a first cylindrical outer surface 112 extending along at least a portion of its length with at least one flat notch 114 disposed in the first cylindrical outer surface 112 adjacent to the distal end 106 of the shaft 8. Each of the at least one flat notches 114 lies in one of a plurality of planes, where each of the planes is parallel to the longitudinal axis of the shaft 8.

In a preferred embodiment of the self-aligning drum beater assembly of the instant invention, the taper 104 of the shaft 8 extends from a medial position 116 along the shaft. As shown in FIG. 9, the taper 104 of the shaft 8 extends from the medial position 116 along the shaft toward the proximal end 108 of the shaft 8. The proximal end 108 of the shaft 8 is adapted to engage a standard bass drum foot pedal having an opening of 0.250". A normal Bass Drum beater shaft is a straight rod having a diameter suitably sized to be captured in a 0.250" hole of a standard Bass Drum Pedal. Generally, the shafts are made of stainless steel rod stock to fit inside this standard hole of 0.250"—usually 0.234" (15/64 inch). The shaft 8 of the improved self-aligning drum beater assembly 1 employs a taper 104 from a medial position 116 along the shaft tapering toward the proximal end 108 of the shaft that is captured in the hole of a standard Bass Drum Pedal. In a preferred embodiment of the invention the diameter of the shaft at the medial position 116 exceeds a quarter inch.

Figure 8:
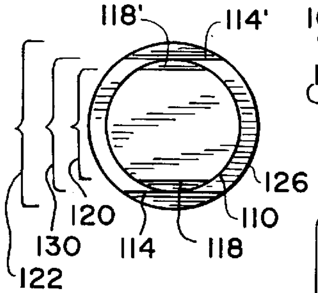
FIG. 8 is a top plan view of the shaft of FIG. 9.

Referring to FIGS. 8 and 9, the shaft 8 has a longitudinal axis and a first cylindrical outer surface 112 extending along at least a portion of its length with at least one flat notch 114 disposed in the first cylindrical outer surface adjacent to the distal end 106 of the shaft. Each of the at least one flat notches 114 lies in one of a plurality of planes; each of the planes being parallel to the longitudinal axis of the shaft.

In a preferred embodiment of the invention, as shown in FIG. 8 and 9, the shaft 8 has a longitudinal axis and a first cylindrical outer surface 112 extending along at least a portion 110 of its length with a first flat notch 114 and a second flat notch 114' disposed in the first cylindrical outer surface 112 adjacent to the distal end 106 of the shaft. The first flat notch 114 and the second flat notch 114' each lie in one of a plurality of parallel planes, where each of the plurality of parallel planes is parallel to the longitudinal axis of the shaft. The parallel plane in which the first flat notch 114 is disposed is at a first spaced distance 120 from the parallel plane in which the second flat notch 114' is disposed.

Referring to FIG. 9, a preferred embodiment of the invention shows the first flat notch 114 and the second flat notch 114' extending generally along a like portion of the first cylindrical outer surface 112 of the shaft 8 and wherein both the first flat notch 114 and the second flat notch 114' are disposed between the distal end 106 of the shaft and the lateral groove 30. The first flat notch 114 and the second flat notch 114' are disposed at a second spaced distance 124 from the lateral groove 30 of the shaft 8. As shown in FIG. 9, the first cylindrical outer surface 112 of the shaft 8 extends beyond the lateral groove 30 toward the proximal end 108 of the shaft from the lateral groove to a second cylindrical outer surface 126 of the shaft.

Referring to FIG. 8, the second cylindrical outer surface 126 has a third flat notch 118 and a fourth flat notch 118'. The third flat notch 118 and the fourth flat notch 118' each lie in one of a plurality of parallel planes that are parallel to the respective planes in which the first flat notch 114 and the second flat notch 114' are respectively disposed. The parallel plane in which the third flat notch 118 is disposed is at a third spaced distance 122 from the parallel plane in which the fourth flat notch 118' is disposed.

The diameter of the first cylindrical outer surface 130 of the shaft is less than or substantially the same as the third spaced distance 122 between the parallel plane in which the third flat notch is disposed and the parallel plane in which the fourth flat notch is disposed.

In a preferred embodiment of the invention, as shown in FIG. 9, the shaft has a taper 104 extending from a medial position 116 along the shaft 8 toward the proximal end 108 of the shaft. The medial position 116 along the shaft may be adjacent to the second cylindrical outer surface 126 of the shaft 8.

In a preferred embodiment of the invention a self-aligning drum beater assembly for use with a flat striking surface of a bass drum may comprise a drum beater head 1 having a bottom and at least one side surface with at least one impact surface disposed on the at least one side surface and an elongated passageway extending from the bottom thereof to receive a shaft; and a means for mounting the head to an upwardly extending shaft while leaving the impact surface of the head free for angular displacement relative to the shaft and for circumferential rotation about the shaft. The means for mounting may further comprise an insertable pad 128 in operative association with the shaft 8. The head 1 has a recess 132 sized to receive the pad 128. The pad, which may be thicker than a wall section of the head in which the recess is disposed, engages the shaft disposed in the head to hinder circumferential rotation of the head 1 about the shaft 8.

In another preferred embodiment of the invention for a self-aligning drum beater assembly for use with a flat striking surface of a bass drum, a shaft 8 having a distal end 106 and a proximal end 108 with a lateral groove 30 disposed near the distal end is provided along with a drum beater head 1 having a bottom and at least one side surface with at least one impact surface disposed on the at least one side surface and an elongated passageway 8' extending from the bottom thereof to receive the distal end 106 of the shaft 8, and a means for mounting the head to the upwardly extending shaft 8 while leaving the impact surface of the head free for angular displacement relative to the shaft and for circumferential rotation about the shaft 8.

In another preferred embodiment of the invention a self-aligning drum beater assembly for use with a flat striking surface of a bass drum, a shaft having a taper 104 extending along at least a segment of its length is taught with a drum beater head 1 having a bottom and at least one side surface with at least one impact surface disposed on the at least one side surface and an elongated passageway 8' extending from the bottom thereof to receive the shaft 8, and a means for mounting the head to an upwardly extending shaft while leaving the impact surface of the head free for angular displacement relative to the shaft and for circumferential rotation about the shaft.

In such embodiment the shaft 8 has a distal end 106 and a proximal end 108, with a lateral groove 30 disposed adjacent to the distal end for engaging the head 1. A preferred embodiment of the invention provides the shaft 8 with a taper 104 extending from a medial position 116 along the shaft 8. The taper of the shaft may extend from a medial position along the shaft toward the proximal end 108 of the shaft.

In a preferred embodiment of the invention the shaft has a longitudinal axis and a first cylindrical outer surface 112 extending along at least a portion 110 of its length with at least one flat notch 114 disposed in the first cylindrical outer surface adjacent to the distal end of the shaft. Each of the at least one flat notches lies in one of a plurality of planes. Each of the planes being parallel to the longitudinal axis of the shaft.

Figure 11:
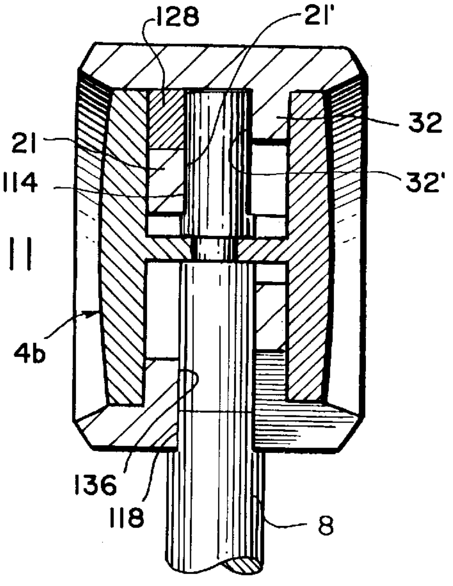
FIG. 11 is a cross-sectional view taken along the line 7—7 of FIG. 3 showing the pad and recess of the second preferred embodiment of the self-aligning beater of FIG. 10.

As best shown in FIG. 11, the drum beater head has means for engaging the at least one flat notch to selectively align the head with the shaft. The means for engaging comprises at least one wall section 134 disposed in abutting engagement with the at least one flat notch 114 of the shaft. The shaft has a longitudinal axis and a first cylindrical outer surface 112 extending along at least a portion 110 of its length with at least one flat notch disposed in the first cylindrical outer surface 112 adjacent to the distal end 106 of the shaft 8. Each of the at least one flat notches lies in one of a plurality of planes. Each of the planes being parallel to the longitudinal axis of the shaft.

In a preferred embodiment of the invention the means for engaging comprises a first parallel wall section 21 and a second parallel wall section 32 (heretofore referred to as a nub). The first wall section and the second wall section each have an interior surface (21' and 32', respectively). The interior surface 21' of the first wall section 21 lies in a plane that is parallel to the plane of the interior surface 32' of the second wall section 32. The plane in which the interior surface of the first wall section is disposed is at a fourth spaced distance from the parallel plane in which the interior surface of the second wall section is disposed, and the first spaced distance 120 is sufficiently greater than the fourth spaced distance to cause the head to remain selectively aligned with the shaft during play and to be manually rotatable circumferentially about the shaft.

In a preferred embodiment of the invention, the first cylindrical outer surface 112 of the shaft 8 extends beyond the lateral groove 30 toward the proximal end 108 of the shaft 8 from the lateral groove 30 to a second cylindrical outer surface 126 of the shaft 8. The second cylindrical outer surface 126 has a third flat notch 118 and a fourth flat notch 118'. The third flat notch 118 and the fourth flat notch 118' each lie in one of a plurality of parallel planes that are parallel to the respective planes in which the first flat notch 114 and the second flat notch 114' are disposed. The parallel plane in which the third flat notch is disposed is at a third spaced distance 122 from the parallel plane in which the fourth flat notch is disposed.

As shown in FIG. 11, the means for engaging comprise a planar surface 136 disposed in the elongated passageway 8' of the head 1 and wherein the third flat notch 118 and the fourth flat notch 118' are each adapted to receive a portion of the planar surface 136 in an engaging manner when the head 1 is selectively aligned with the shaft 8. Only one of either the third flat notch 118 or the fourth flat notch 118' may be in contact with said planar surface 136 while the flat notch not in contact may serve as a visual alignment reference for the drummer.

The self-aligning drum beater assembly of claim 33, wherein the diameter 130 of the first cylindrical outer surface of the shaft is less than or substantially the same as the third spaced distance 122 between the parallel plane in which the third flat notch 118 is disposed and the parallel plane in which the fourth flat notch 118' is disposed. In such preferred embodiment, the shaft may have a taper 104 extending from a medial position 116 along the shaft 8 toward the proximal end 108 thereof. The medial position along the shaft may be positioned adjacent to the second cylindrical outer surface of the shaft.

Moreover, the means for mounting may further comprise a pad 128 in operative association with the shaft 8 and the head 1 may have a recess 132 sized to receive the friction pad 128. Whereby, the pad 128 disposed in the head 1 engages the shaft 8 to hinder circumferential rotation of the head about the shaft.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

Further, the purpose of the foregoing specification is to enable the U.S. Patent and Trademark Office and the public generally, and especially the scientist, engineers and practitioners in the art who are not familiar with patent or legal terms of phraseology, to determine quickly from a cursory inspection the nature and essence of the technical disclosure of the application. The foregoing is neither intended to define the invention of the application, which is measured by the claims, nor is it intended to be limiting as to the scope of the invention in any way.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. A self-aligning drum beater assembly for use with a flat striking surface of a bass drum comprising a shaft having a distal end for receiving a beater and a proximal end for receiving a drum pedal with a taper extending along at least a segment of its length tapering toward the proximal end of the shaft.

2. The self-aligning drum beater assembly of claim 1, wherein the shaft is composed of Titanium.

3. The self-aligning drum beater assembly of claim 1, wherein the shaft has a lateral groove disposed near the distal end.

4. The self-aligning drum beater assembly of claim 3, wherein the taper of the shaft extends from a medial position along the shaft toward the proximal end of the shaft.

5. The self-aligning drum beater assembly of claim 4, wherein the diameter of the shaft at the medial position exceeds a quarter inch.

6. The self-aligning drum beater assembly of claim 1, wherein the taper of the shaft extends from a medial position along the shaft.

7. A self-aligning drum beater assembly for use with a flat striking surface of a bass drum comprising a shaft having a taper extending along at least a segment of its length and wherein the shaft has a distal end and a proximal end with a lateral groove disposed near the distal end and the shaft has a longitudinal axis and a first cylindrical outer surface extending along at least a portion of its length with at least one flat notch disposed in said first cylindrical outer surface adjacent to the distal end of the shaft, each of said at least one flat notches lies in one of a plurality of planes, each of said planes being parallel to the longitudinal axis of the shaft.

8. A self-aligning drum beater assembly for use with a flat striking surface of a bass drum comprising a shaft having a distal end and a proximal end with a lateral groove disposed near the distal end, wherein the shaft has a longitudinal axis and a first cylindrical outer surface extending along at least a portion of its length with at least one flat notch disposed in said first cylindrical outer surface adjacent to the distal end of the shaft, each of said at least one flat notches lies in one of a plurality of planes, each of said planes being parallel to the longitudinal axis of the shaft.

9. A self-aligning drum beater assembly for use with a flat striking surface of a bass drum comprising a shaft having a distal end and a proximal end with a lateral groove disposed near the distal end, wherein the shaft has a longitudinal axis and a first cylindrical outer surface extending along at least a portion of its length with a first flat notch and a second flat notch disposed in said first cylindrical outer surface adjacent to the distal end of the shaft, said first flat notch and said second flat notch each lie in one of a plurality of parallel planes, each of said plurality of parallel planes is parallel to the longitudinal axis of the shaft, said parallel plane in which the first flat notch is disposed is at a first spaced distance from the parallel plane in which the second flat notch is disposed.

10. The self-aligning drum beater assembly of claim 9, wherein the first flat notch and the second flat notch extend generally along a like portion of the first cylindrical outer surface of the shaft and wherein both the first flat notch and the second flat notch are disposed between the distal end of the shaft and the lateral groove, said first flat notch and said second flat notch being disposed at a second spaced distance from the lateral groove of the shaft.

11. The self-aligning drum beater assembly of claim 10, wherein the first cylindrical outer surface of the shaft extends beyond the lateral groove toward the proximal end of the shaft from the lateral groove to a second cylindrical outer surface of the shaft, said second cylindrical outer surface has a third flat notch and a fourth flat notch, said third flat notch and said fourth flat notch each lie in one of a plurality of parallel planes that are parallel to the respective planes in which the first flat notch and the second flat notch are respectively disposed, said parallel plane in which the third flat notch is disposed is at a third spaced distance from the parallel plane in which the fourth flat notch is disposed.

12. The self-aligning drum beater assembly of claim 11, wherein the diameter of the first cylindrical outer surface of the shaft is less than the third spaced distance between the parallel plane in which the third flat notch is disposed and the parallel plane in which the fourth flat notch is disposed.

13. The self-aligning drum beater assembly of claim 11, wherein the diameter of the first cylindrical outer surface of the shaft is substantially the same as the third spaced distance between the parallel plane in which the third flat notch is disposed and the parallel plane in which the fourth flat notch is disposed.

14. The self-aligning drum beater assembly of claim 11, wherein the shaft has a taper extending from a medial position along the shaft toward the proximal end of the shaft.

15. The self-aligning drum beater assembly of claim 14, wherein the medial position along the shaft is adjacent to the second cylindrical outer surface of the shaft.

16. The self-aligning drum beater assembly of claim 14, wherein the diameter of the first cylindrical outer surface of the shaft is less than the third spaced distance between the parallel plane in which the third flat notch is disposed and the parallel plane in which the fourth flat notch is disposed.

17. A self-aligning drum beater assembly for use with a flat striking surface of a bass drum comprising:

a. a drum beater head having a bottom and at least one side surface with at least one impact surface disposed on said at least one side surface and an elongated passageway extending from the bottom thereof to receive a shaft; and b. a means for mounting the head to an upwardly extending shaft while leaving the impact surface of the head free for angular displacement relative to said shaft and for circumferential rotation about said shaft, said means for mounting further comprises a pad in operative association with the shaft and wherein the head has a recess sized to receive said friction pad, whereby, the pad engages the shaft disposed in said head to hinder circumferential rotation of the head about the shaft.

18. A self-aligning drum beater assembly for use with a flat striking surface of a bass drum comprising:

a. a shaft having a distal end and a proximal end with a lateral groove disposed near the distal end;

b. a drum beater head having a bottom and at least one side surface with at least one impact surface disposed on said at least one side surface and an elongated passageway extending from the bottom thereof to receive the distal end of the shaft; and c. a means for mounting the head to the upwardly extending shaft while leaving the impact surface of the head free for angular displacement relative to said shaft and for circumferential rotation about said shaft.

19. A self-aligning drum beater assembly for use with a flat striking surface of a bass drum comprising:

a. a shaft having a distal end for receiving a beater and a proximal end for receiving a Bass Drum Pedal with a taper extending along at least a segment of its length tapering toward the proximal end of the shaft;

b. a drum beater head having a bottom and at least one side surface with at least one impact surface disposed on said at least one side surface and an elongated passageway extending from the bottom thereof to receive the shaft; and c. a means for mounting the head to the upwardly extending shaft while leaving the impact surface of the head free for angular displacement relative to said shaft and for circumferential rotation about said shaft.

20. The self-aligning drum beater assembly of claim 19, wherein the shaft has a distal end and a proximal end, with a lateral groove disposed adjacent to the distal end for engaging the head.

21. The self-aligning drum beater assembly of claim 20, wherein the taper of the shaft extends from a medial position along the shaft toward the proximal end of the shaft.

22. The self-aligning drum beater assembly of claim 21, wherein the diameter of the shaft at the medial position exceeds a quarter inch.

23. The self-aligning drum beater assembly of claim 21, wherein the shaft has a longitudinal axis and a first cylindrical outer surface extending along at least a portion of its length with at least one flat notch disposed in said first cylindrical outer surface adjacent to the distal end of the shaft, each of said at least one flat notches lies in one of a plurality of planes, each of said planes being parallel to the longitudinal axis of the shaft.

24. The self-aligning drum beater assembly of claim 20, wherein the shaft has a longitudinal axis and a first cylindrical outer surface extending along at least a portion of its length with a first flat notch and a second flat notch disposed in said first cylindrical outer surface adjacent to the distal end of the shaft, said first flat notch and said second flat notch each lie in one of a plurality of parallel planes, each of said plurality of parallel planes is parallel to the longitudinal axis of the shaft, said parallel plane in which the first flat notch is disposed is at a first spaced distance from the parallel plane in which the second flat notch is disposed.

25. The self-aligning drum beater assembly of claim 24, wherein the drum beater head has means for engaging said first flat notch and said second flat notch to selectively align the head with the shaft.

26. The self-aligning drum beater assembly of claim 25, wherein the means for engaging comprises a first parallel wall section and a second parallel wall section, said first wall section and said second wall section each have an interior surface, the interior surface of the first wall section lies in a plane that is parallel to the plane of the interior surface of the second wall section, the plane in which the interior surface of the first wall section is disposed is at a fourth spaced distance from the parallel plane in which the interior surface of the second wall section is disposed, and wherein the first spaced distance is sufficiently greater than the fourth spaced distance to cause the head to remain selectively aligned with the shaft during play and to be manually rotatable circumferentially about said shaft.

27. The self-aligning drum beater assembly of claim 26, wherein the first flat notch and the second flat notch extend generally along a like portion of the first cylindrical outer surface of the shaft and wherein both the first flat notch and the second flat notch are disposed between the distal end of the shaft and the lateral groove, said first flat notch and said second flat notch being disposed at a second spaced distance from the lateral groove of the shaft.

28. The self-aligning drum beater assembly of claim 27, wherein the first cylindrical outer surface of the shaft extends beyond the lateral groove toward the proximal end of the shaft from the lateral groove to a second cylindrical outer surface of the shaft, said second cylindrical outer surface has a third flat notch and a fourth flat notch, said third flat notch and said fourth flat notch each lie in one of a plurality of parallel planes that are parallel to the respective planes in which the first flat notch and the second flat notch are disposed, said parallel plane in which the third flat notch is disposed is at a third spaced distance from the parallel plane in which the fourth flat notch is disposed.

29. The self-aligning drum beater assembly of claim 28, wherein the means for engaging comprise a planar surface disposed in the elongated passageway of the head and wherein the third flat notch and the fourth flat notch are each adapted to receive a portion of said planar surface in an engaging manner when the head is selectively aligned with the shaft.

30. The self-aligning drum beater assembly of claim 28, wherein the diameter of the first cylindrical outer surface of the shaft is less than the third spaced distance between the parallel plane in which the third flat notch is disposed and the parallel plane in which the fourth flat notch is disposed.

31. The self-aligning drum beater assembly of claim 28, wherein the diameter of the first cylindrical outer surface of the shaft is less than and the third spaced distance between the parallel plane in which the third flat notch is disposed and the parallel plane in which the fourth flat notch is disposed.

32. The self-aligning drum beater assembly of claim 31, wherein the shaft has a taper extending from a medial position along the shaft toward the proximal end of the shaft.

33. The self-aligning drum beater assembly of claim 32, wherein the diameter of the shaft at the medial position exceeds a quarter inch.

34. The self-aligning drum beater assembly of claim 33, wherein the medial position along the shaft is adjacent to the second cylindrical outer surface of the shaft.

35. The self-aligning drum beater assembly of claim 34, wherein the means for mounting further comprises a pad in operative association with the shaft and wherein the head has a recess sized to receive said friction pad, whereby, the pad engages the shaft disposed in said head to hinder circumferential rotation of the head about the shaft.

36. The self-aligning drum beater assembly of claim 35, wherein the shaft is composed of Titanium.

37. The self-aligning drum beater assembly of claim 19, wherein the taper of the shaft extends from a medial position along the shaft.

38. The self-aligning drum beater assembly of claim 19, wherein the shaft is composed of Titanium.

39. A self-aligning drum beater assembly for use with a flat striking surface of a bass drum comprising:

d. a shaft having a distal end and a proximal end with a lateral groove disposed near the distal end;

e. a drum beater head having a bottom and at least one side surface with at least one impact surface disposed on said at least one side surface and an elongated passageway extending from the bottom thereof to receive the distal end of the shaft;

f. a means for mounting the head to the upwardly extending shaft while leaving the impact surface of the head free for angular displacement relative to said shaft and for circumferential rotation about said shaft; and wherein the shaft has a longitudinal axis and a first cylindrical outer surface extending along at least a portion of its length with at least one flat notch disposed in said first cylindrical outer surface adjacent to the distal end of the shaft, each of said at least one flat notches lies in one of a plurality of planes, each of said planes being parallel to the longitudinal axis of the shaft.

40. The self-aligning drum beater assembly of claim 39, wherein the drum beater head has means for engaging said at least one flat notch to selectively align the head with the shaft.

41. The self-aligning drum beater assembly of claim 40, wherein the means for engaging comprises at least one wall section disposed in abutting engagement with said at least one flat notch of the shaft.

* * * * *